United States Patent
Whiteside

(10) Patent No.: US 9,592,795 B1
(45) Date of Patent: Mar. 14, 2017

(54) THEFT DETERRENCE, PREVENTION, AND RECOVERY SYSTEM AND METHOD

(71) Applicant: James A. Whiteside, Clayton, OH (US)

(72) Inventor: James A. Whiteside, Clayton, OH (US)

( * ) Notice: Subject to any disclaimer, the term of this patent is extended or adjusted under 35 U.S.C. 154(b) by 0 days.

(21) Appl. No.: 14/929,954

(22) Filed: Nov. 2, 2015

(51) Int. Cl.
| | |
|---|---|
| *B60R 25/10* | (2013.01) |
| *B60R 25/30* | (2013.01) |
| *B60R 1/00* | (2006.01) |
| *G01S 19/13* | (2010.01) |
| *B60R 25/24* | (2013.01) |
| *B60R 25/04* | (2013.01) |
| *B60R 25/102* | (2013.01) |

(52) U.S. Cl.
CPC .............. *B60R 25/305* (2013.01); *B60R 1/00* (2013.01); *B60R 25/04* (2013.01); *B60R 25/102* (2013.01); *B60R 25/24* (2013.01); *G01S 19/13* (2013.01); *B60R 2300/8073* (2013.01)

(58) Field of Classification Search
CPC . B60R 25/102; B60R 25/33; B60R 2325/205; B60R 25/1004; B60R 25/10; B60R 25/104; B60R 25/25; B60R 25/1001; B60R 25/1003; B60R 2021/01006; B60R 25/00; B60R 25/305; H04M 11/04; G08B 13/19647
See application file for complete search history.

(56) References Cited

U.S. PATENT DOCUMENTS

| | | | |
|---|---|---|---|
| 4,908,629 A | 3/1990 | Apsell et al. | |
| 5,014,206 A | 5/1991 | Scribner et al. | |
| 5,223,844 A | 6/1993 | Mansell et al. | |
| 5,608,272 A | 3/1997 | Tanguay | |
| 5,673,305 A | 9/1997 | Ross | |
| 5,918,180 A * | 6/1999 | Dimino | B60R 25/102 340/988 |
| 5,939,975 A * | 8/1999 | Tsuria | B60R 25/04 307/10.5 |
| 6,014,555 A * | 1/2000 | Tendler | H04M 1/578 379/51 |
| 6,198,996 B1 * | 3/2001 | Berstis | B60R 25/2018 701/36 |
| 6,644,415 B1 * | 11/2003 | Mohamed | A62C 3/07 169/54 |
| 6,864,829 B2 | 3/2005 | Bervoets et al. | |
| 7,064,651 B2 | 6/2006 | Goetz | |
| 7,443,286 B2 * | 10/2008 | Nakane | B60R 25/1012 340/425.5 |
| 7,561,102 B2 | 7/2009 | Duvall | |

(Continued)

*Primary Examiner* — Quang D Pham
(74) *Attorney, Agent, or Firm* — Dale J. Ream

(57) ABSTRACT

A theft deterrence, prevention, and recovery system for use in monitoring a theft status of a vehicle includes a cabin module positioned in the interior cabin of a vehicle, the cabin module having a memory, a processor, and an input device such as a touch screen display. The cabin module may include a camera configured to record video in the cabin vehicle and a cabin microphone configured to record audio in the vehicle cabin. The input device may be activated by a driver to indicate the immediate occurrence of an emergency event—such as a carjacking. If the input device is activated, the camera, microphone, and a global position (GPS) device may be activated. Collected data may be transmitted, such as by cellular or electromagnetic infrared signals. A vehicle smoke sensor may also be included.

5 Claims, 7 Drawing Sheets

(56) References Cited

U.S. PATENT DOCUMENTS

| | | | |
|---|---|---|---|
| 7,586,401 B2 | 9/2009 | Payne | |
| 7,768,393 B2 | 8/2010 | Nigam | |
| 8,044,782 B2 * | 10/2011 | Saban | B60N 2/002 340/438 |
| 8,299,894 B1 * | 10/2012 | Semeniuk | 307/10.2 |
| 9,315,152 B1 * | 4/2016 | Maestas | G01S 19/13 |
| 2002/0052191 A1 * | 5/2002 | Bristow | B60R 25/1004 455/405 |
| 2002/0084918 A1 * | 7/2002 | Roach | G08G 1/205 340/988 |
| 2002/0097145 A1 * | 7/2002 | Tumey | B60R 25/04 340/426.28 |
| 2006/0103529 A1 * | 5/2006 | Ohmura | B60R 25/1001 340/568.1 |
| 2006/0132294 A1 * | 6/2006 | Spark | B60R 25/1003 340/426.1 |
| 2009/0051510 A1 * | 2/2009 | Follmer | G07C 5/008 340/425.5 |
| 2009/0120275 A1 * | 5/2009 | Chukwu | F41A 19/58 89/41.05 |
| 2009/0134986 A1 * | 5/2009 | Bauer | B60R 25/104 340/426.23 |
| 2010/0060412 A1 | 3/2010 | Johnson | |
| 2012/0116640 A1 | 5/2012 | Oh et al. | |
| 2013/0057396 A1 * | 3/2013 | Winslow | B60R 25/33 340/426.19 |
| 2015/0170429 A1 * | 6/2015 | Denny | B60W 30/09 701/36 |

* cited by examiner

THEFT DETERRENCE, PREVENTION, AND RECOVERY SYSTEM AND METHOD

BACKGROUND OF THE INVENTION

This invention relates generally to anti-theft products and systems for deterring or preventing the theft of automobiles and, more particularly, to a system installed inside the cabin of an automobile by which a driver can instantly signal an event such as a carjacking and, upon doing so, activate audio, video, global position data, and provide remote control over vehicle components.

Theft deterrent devices such as car alarms are well known. Unfortunately, hearing one or more car alarms blaring in a crowded parking lot rarely raises much attention anymore. Theft prevention devices, such as a bar mounted to a steering wheel and that prevents its operation, are bulky and inconvenient. Further, tracking devices positioned in a car are useful for tracking a stolen car although they may not actually be activated and functioning when needed. Although each of the systems described above are presumably effective for their intended purposes, they are not effective to enable a driver who is victim to a carjacking—i.e. when a thief proactively forces a driver out of the car and then drives off in it.

Therefore, it would be desirable to have a system and method for vehicle theft deterrence, prevention, and recovery that enables a driver to instantly signal a carjacking. Further, it would be desirable to have a system that enables a driver to instantly notify authorities of a vehicle theft, such as with a mobile application and to initiate instant tracking and even monitoring of events inside the vehicle. Finally, it would be desirable to have a system in which law enforcement authorities and even the driver can initiate control over elements of the stolen vehicle that may help to apprehend the alleged thief or rescue an abducted passenger, such as being able to lock or unlock the doors, raise or lower windows, deliver audio or text messages, send audible messages, and the like.

SUMMARY OF THE INVENTION

A theft deterrence, prevention, and recovery system according to the present invention for use in monitoring a theft status of a vehicle includes a cabin module positioned in the interior cabin of a vehicle, the cabin module having a memory, a processor, and an input device such as a touch screen display. The cabin module may include a camera configured to record video in the cabin vehicle and a cabin microphone configured to record audio in the vehicle cabin. The input device may be activated by a driver to indicate the immediate occurrence of an emergency event—such as a carjacking. If the input device is activated, the camera, microphone, and a global position (GPS) device may be activated. Collected data may be transmitted, such as by cellular or electromagnetic infrared signals. A vehicle smoke sensor may also be included. The driver may indicate a carjacking from inside the vehicle. In addition, a driver may use a mobile application to monitor his stolen vehicle, to notify the authorities, or even to operate vehicle controls remotely, such as de-energizing the engine, lock the doors, activate audio and video devices, and the like.

Therefore, a general object of this invention is to provide a theft deterrence, prevention, and recovery system.

Another object of this invention is to provide a system, as aforesaid, that enables a driver to instantly signal remote law enforcement, private security, or third parties of a carjacking in real time with the press of a button.

Still another object of this invention is to provide a system, as aforesaid, that collects and transmits audio, visual, and global position data relative to a vehicle when an emergency event such as a carjacking is indicated.

Yet another object of this invention is to provide a system, as aforesaid, that includes a mobile application that enables a driver who is outside his vehicle to instantly alert authorities of a theft and to initiate control over vehicle systems.

A further object of this invention is to provide a system, as aforesaid, that monitors and alerts if a fire event is detected and enables remote authorities to control vehicle systems such as door locks and windows to act in the safety interests of passengers in the vehicle.

A still further object of this invention is to provide a system, as aforesaid, that provides enhanced safety to innocent people who would otherwise be along the roadway of a speeding stolen vehicle and a pursuing police vehicle.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1b is an isolated view on an enlarged scale taken from FIG. 1a;

FIG. 2b is an isolated view on an enlarged scale taken from FIG. 2a;

DESCRIPTION OF THE PREFERRED EMBODIMENT

Figure 1A:
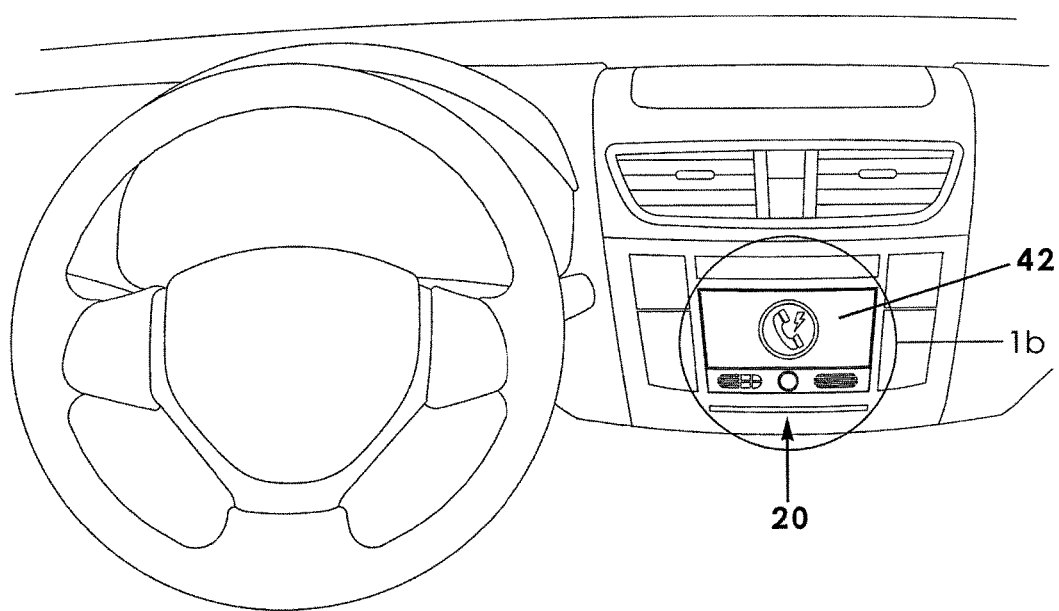
FIG. 1a is a perspective view of a theft deterrence, prevention, and recovery system according to a preferred embodiment of the present invention.
Figure 1B:
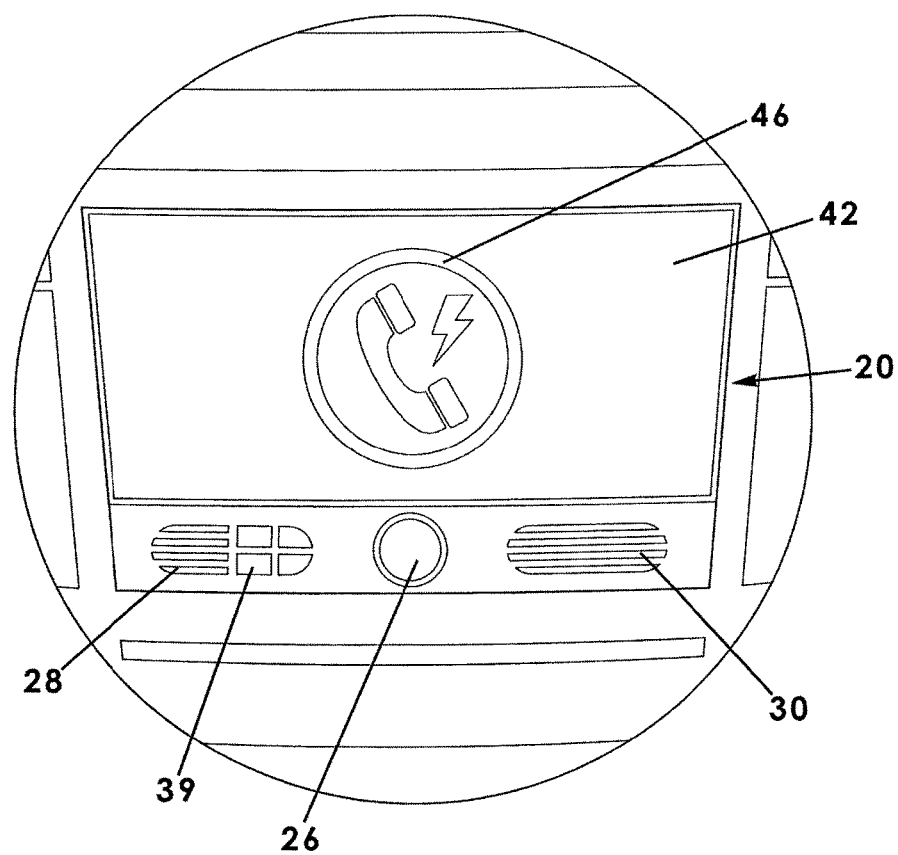
Figure 2A:
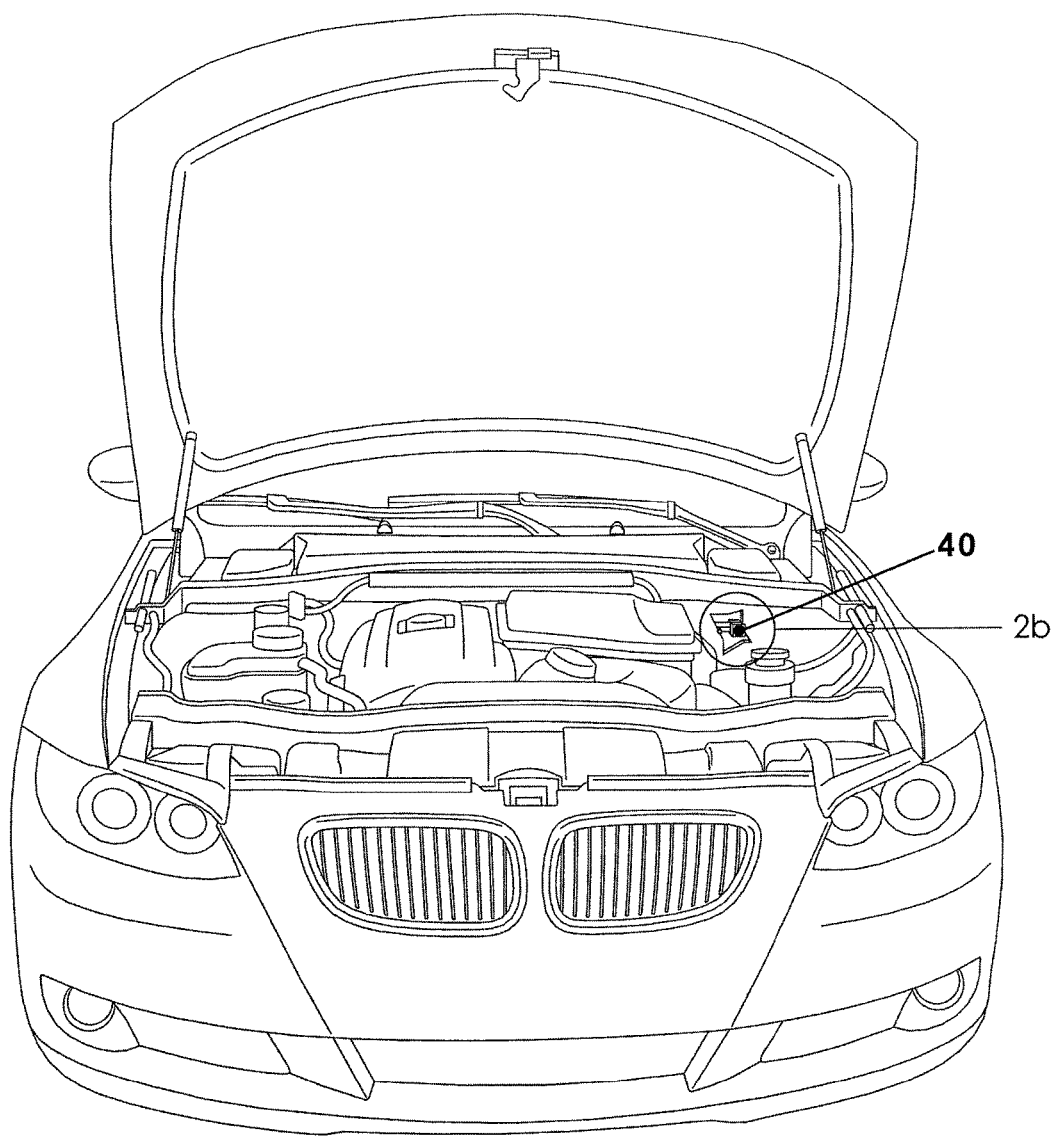
FIG. 2a is a perspective view of an engine compartment of a vehicle illustrating an auxiliary fire event sensor.
Figure 2B:
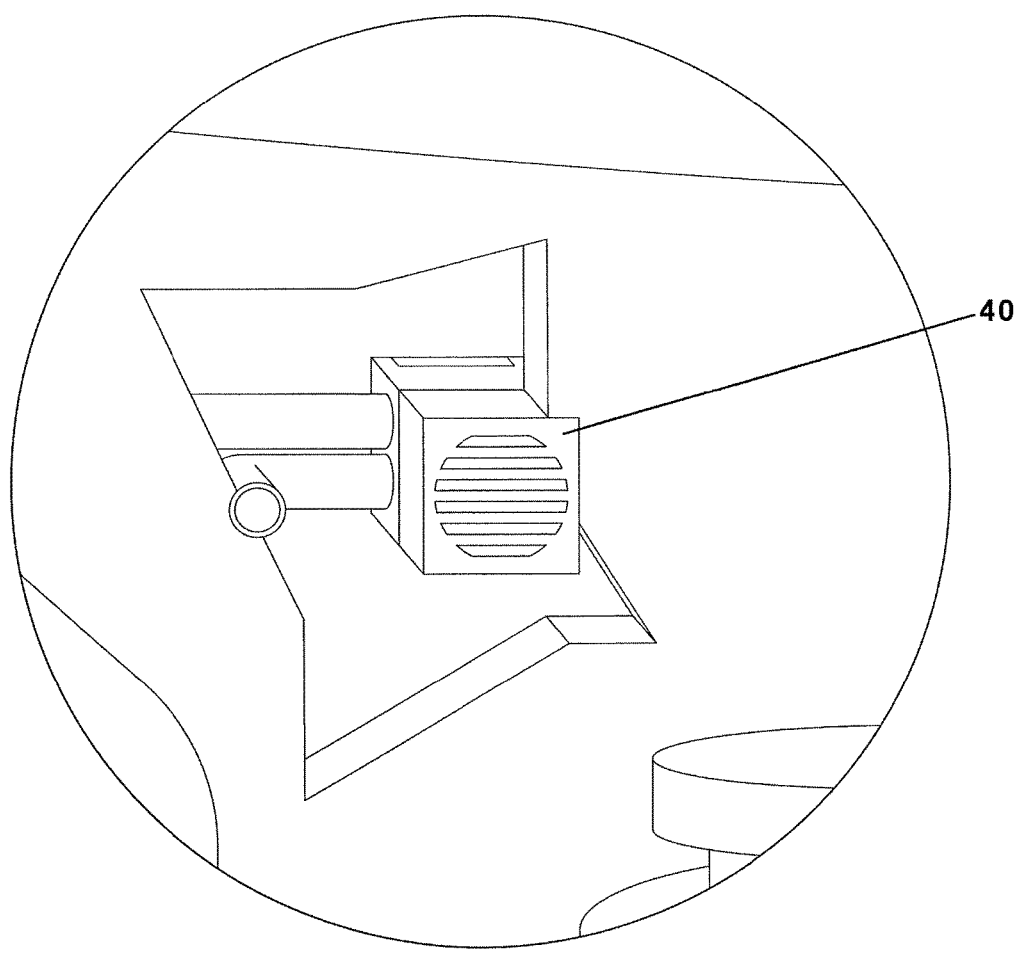
Figure 3:
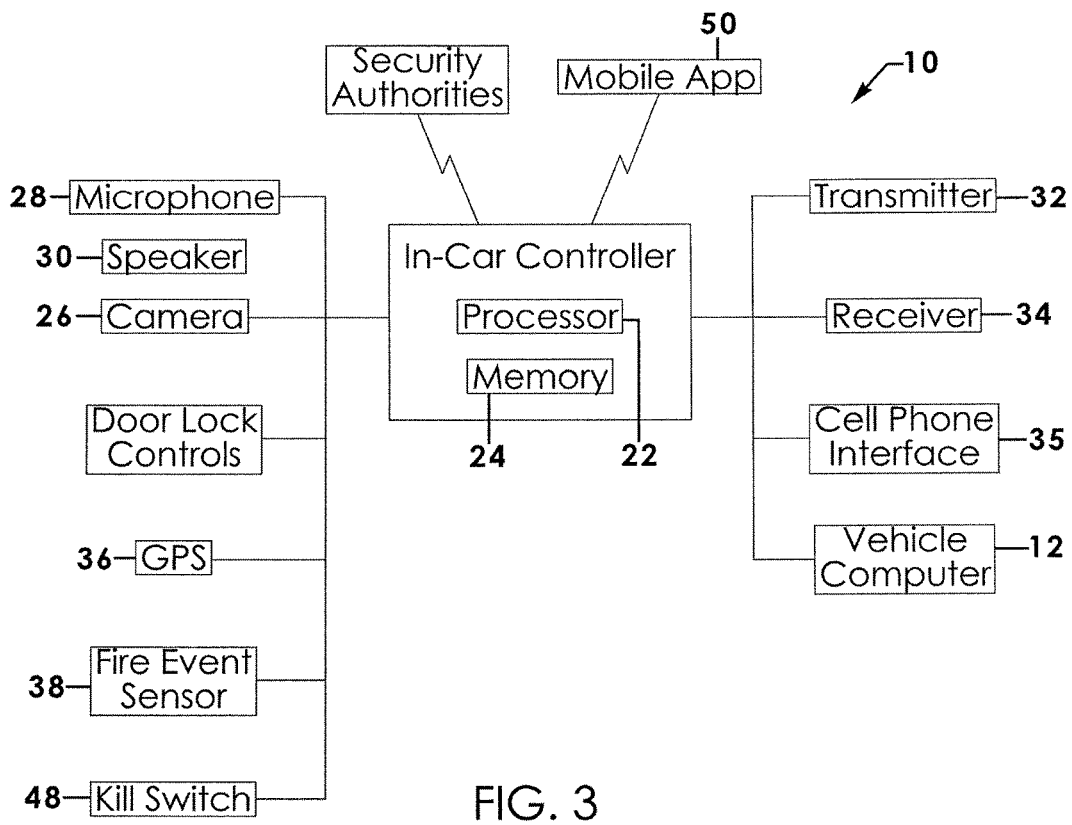
FIG. 3 is a block diagram illustrating the present invention schematically.
Figure 4:
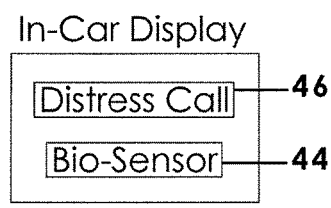
FIG. 4 is a block diagram of the input device/cabin display.

A system and method for deterring, preventing, and recovering theft of a vehicle according to a preferred embodiment of the present invention will now be described in detail with reference to FIGS. 1 to 9 of the accompanying drawings. The deterrence, prevention, and recovery system 10 includes a cabin module 20 may be positioned in the interior cabin of a vehicle and is in communication with a vehicle computer 12.

The cabin module 20 may be positioned on the console or dashboard of the interior of a vehicle. The cabin module 20 includes a cabin memory 24 configured to store data and programming instructions and includes a cabin processor 22 in data communication with the cabin memory 24. The cabin processor 22 is configured to execute programming instructions stored in memory 24, such as to direct various sensors and electronic devices to collect data and to transmit that data, as will be described later.

The cabin module 20 includes at least one cabin camera 26 that is operable to record video data, either for storage, later playback, or to be streamed in real time. The cabin camera 26 is in data communication with the cabin processor 22 so that the cabin processor 22 can selectively energize the cabin camera 26 and recorded data may be directed into storage locations in memory 24 or to be transmitted as will be described later. Similarly, the cabin module 20 may include a microphone 28 configured to collect audio input from inside the cabin area. The cabin camera 26 and cabin microphone 28 may be positioned on the cabin module 20 such that video and audio data may be collected simultaneously when activated. The cabin camera 26 and cabin microphone 28 are in data communication with the cabin processor 22 such that the cabin processor 22, when executing respective programming instructions, selectively causes the collection of video and audio data from inside the vehicle cabin, such as voices, commotion, or the like. The microphone 28 may be in data communication with the cabin processor 22 and cabin memory 24 so that recorded audio data may be directed to memory 24.

In addition, the cabin module 20 may include a speaker 30 in data communication with the cabin processor 22 and cabin memory 24. The speaker 30 is configured to emit audible sounds, for example, from audio data stored in memory 24 or received from remote signal transmissions as will be described later in more detail.

Further, the cabin module 20 may include a global position system (GPS) module 36 that is in data communication with the cabin processor 22. Under programming control, the cabin processor 22 selectively energizes the GPS module 36 for the collection of GPS data and may, in some embodiments, associates corresponding GPS data with real time video and audio data. The collected video, audio, and GPS data may, at first, be stored in the memory 24 but may then be transmitted to predetermined security authorities.

In an embodiment, the cabin module 20 may include a fire event sensor 38 positioned on or inside the cabin module 20. The cabin fire event sensor 38 is configured to determine the presence of a fire event such as fire, smoke, carbon monoxide, or the like. It is understood that the fire event sensor 38 may include a smoke sensor, a heat sensor, a carbon monoxide gas sensor, or the like. The fire event sensor 38 is in data communication with the cabin processor 22. In an embodiment, an auxiliary fire event sensor 40 may be situated in the engine compartment of a vehicle and be specifically purposed to detect an engine fire. Preferably, the auxiliary fire event sensor 40 is a smoke detector. The auxiliary fire event sensor 40 is in data communication with the cabin processor 22, either by wire connections or by wireless communication technology. If either fire event sensor detects a fire event, respective data is delivered to the cabin processor 22 which, under program control, actuates the cabin transmitter 32 to transmit a fire alert signal to respective law enforcement, security, or other predetermined personnel. In addition, the cabin processor 22 may simultaneously transmit real-time GPS data collected from the GPS module 36 so that notified authorities can immediately know the location of the vehicle. The cabin processor 22 may also actuate the camera 26 and microphone 28 as described above, especially if an emergency event such as a carjacking has also been indicated as will be described further below. A vent 39 for receiving and guiding smoke to the fire event sensor 38 may be included on the cabin module 20.

The cabin module 20 may include a display screen. The cabin module 20 also includes an input device 42 in data communication with the cabin processor 22 and is configured to receive user input data indicative of an emergency event, such as a carjacking in progress. The input device 42 may also be used to enter initial data about an authorized driver or drivers, vehicle registration, third parties and security phone numbers to notify in case of emergency, and the like.

Preferably, the input device 42 is a touch screen such that the input device 42 and display screen may have a unitary construction. In addition, the input device 42 may include a biosensor 44. Specifically, the touch screen may include an area on which a driver may position a fingertip so that a finger print may be photographed, scanned, or otherwise recorded for comparison with previously stored fingerprint patterns. One or more "authorized finger prints" may be stored in or recorded in respective memory locations. For security purposes, a driver may be required to press his finger against a designated part of the display screen of the input device 42 in order to activate the system or even to allow the car to be started. Then, a designated area of the input device 42 (display screen) may be monitored, under program control, for the driver to actuate as an indication of an emergency event, such as a carjacking. More particularly, the display screen may display a distress call "button" 46 to be pressed by a driver's finger to set into action a series of events, including activating the camera 26 to record video inside the vehicle interior area, activating the microphone 28 to record audio in or proximate the vehicle interior area, to transmit signals (such as cell phone signals or electromagnetic signals, or the like) to law enforcement or other third parties, or to web or software applications remote from the vehicle, as will be described in more detail later.

In addition to the cabin transmitter 32 described above, the cabin module 20 includes a cabin receiver 34 configured to receive data, respectively. The cabin transmitter 32 and cabin receiver 34 are in data communication with the cabin processor 22. In an embodiment, data corresponding to the status of the security situation within the cabin of the vehicle and the area proximate the vehicle may be transmitted via electromagnetic signals although other signal transmission forms would also work, such as by cellular telephone signals via a cell phone interface 35. The transmitted signals may be encrypted for added security. For instance, when the cabin module 20 has been activated—meaning that video data from the at least one cabin camera 26, audio data from the at least one cabin microphone 28, GPS data from the GPS module 36, the collected data may be transmitted via the cabin transmitter 32. The transmission function would be controlled by the cabin processor 22 under programming control. It is understood that the cabin module 20 may include a plurality of cabin cameras, cabin microphones, and other sensors such that the video data is more complete or even panoramic.

In an embodiment, the cabin module 20 may also include a "motor-kill circuit" 48 or equivalent programming step. It is understood that the cabin module 20 and, specifically, the cabin processor 22, is electrically connected to the vehicle computer 12 that operates much of the operation of the vehicle. Therefore, when actuated, the motor-kill circuit 48 is configured to instruct the vehicle computer 12 to deactivate or de-energize the vehicle's engine. In use, such actuation of the motor-kill circuit 48 may come by receiving a respective security action instruction from a mobile application as will be described below.

In an embodiment, the theft deterrence, prevention, and recovery system includes a mobile or software application 50 in data communication with the cabin processor 22. It is understood that the mobile application 50 may include software installed and running on a driver's cell phone or accessible through a website by the driver, law enforcement authorities, or other authorized persons and may be accessible using a password or other security access means. Signals transmitted as described above will be reflected via the mobile application. In a preferred embodiment, the mobile application 50 is most valuable for use by a driver whose vehicle has been stolen, whether by force of a carjacking or by stealth when unoccupied by the driver.

The mobile application 50 is configured to transmit signals that are received by the cabin receiver 34 which is in communication with the cabin processor 22. The signals sent from the mobile application, e.g. by a mobile cell phone, may be in the form of an audio message, a text message, or a vehicle instruction. It is understood that the cabin memory 24 has a plurality of expected vehicle instructions stored in memory locations and can recognize incoming vehicle instructions and includes programming instructions by which the cabin processor 22 actuates specific actions, the cabin processor 22 being in communication with the vehicle computer 12. For instance, when the cabin receiver 34 receives a vehicle instruction, the cabin processor 22 may cause an audio message to be emitted through the cabin speaker 30, to publish a text message to the input device 42 (display), or cause the vehicle computer 12 to actuate a vehicle component according to corresponding vehicle instructions and programming in the cabin memory 24.

More particularly, a received vehicle instruction may cause the processor 22 to direct the vehicle computer 12 to activate the vehicle's door locks. Other vehicle instructions that, when received, result in the cabin module 20 actuating vehicle components in coordination with the vehicle computer 12 may include, but not be limited to, a lock-doors instruction, a raise and lock windows instruction, an activate camera instruction, an activate microphone instruction, and an engine-kill switch instruction.

The mobile application 50 may also be configured to enable a driver who is remote from his vehicle to directly notify law enforcement or third party security authorities that his vehicle has been stolen. The mobile application 50 is able to obtain real-time GPS data from the cabin processor 22 to share with law enforcement, thereby facilitating faster recovery of the stolen vehicle.

Figure 5:
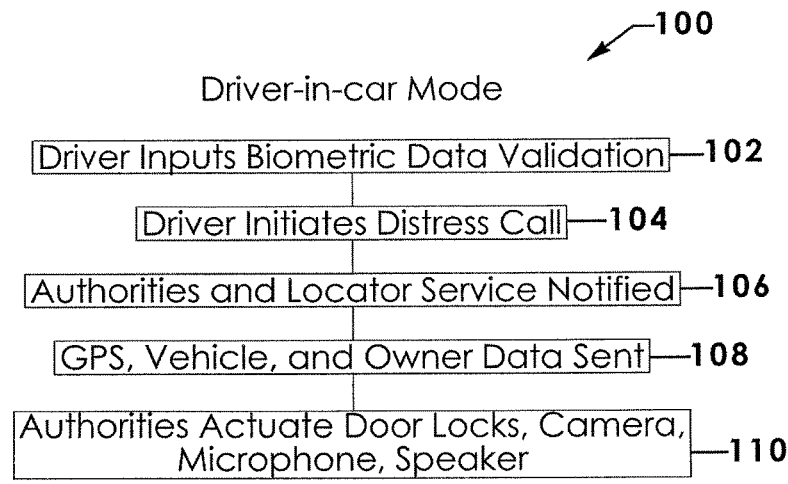
FIG. 5 is a flowchart illustrating a driver-in-car process.
Figure 6:
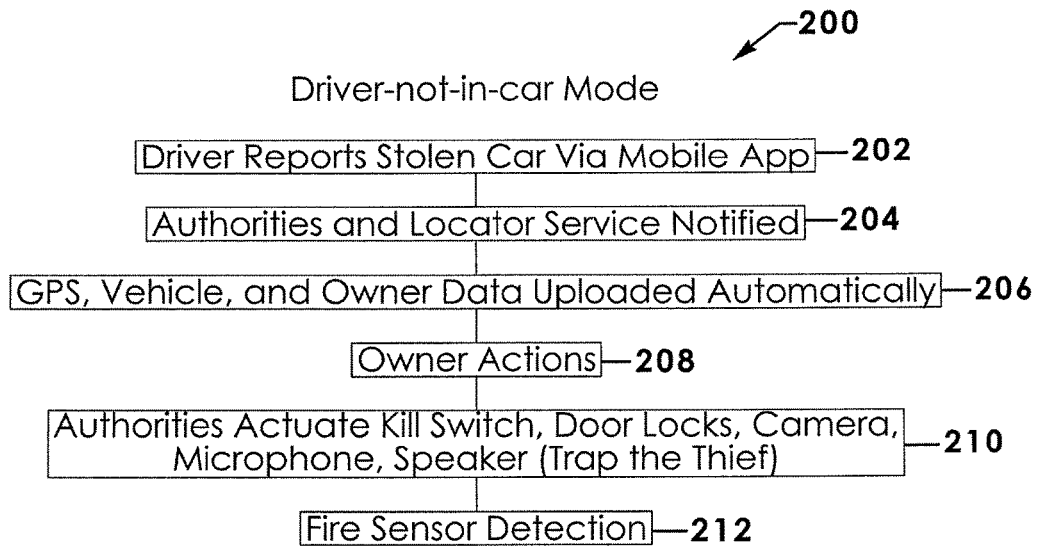
FIG. 6 is a flowchart illustrating a driver-not-in-car process.

In use, the present invention includes several exemplary processes executed by the cabin processor 22 and mobile application 50 pursuant to programming instructions. A "driver-present" process 100 is illustrated in FIG. 5 and represents the processing that takes place when a driver is operating a vehicle in a traditional manner. Process 100 begins at step 102 at which a driver enters biometric data via the input device 42. Specifically, a driver may press the press his or her finger against the touch screen input device 42 where a picture is taken and compared under program control with predetermined "authorized" fingerprint data. If the processor 22 determines the driver is authorized to drive the car, the program continues to run and process 100 continues to step 104.

At step 104, process 100 continuously monitors if an emergency event is indicated by the driver. As described above, a user may simply touch a designated area on the touch screen input device 42 to indicate that an emergency event, such as a carjacking, is occurring. Of course, the present system may be expanded in other embodiments, to monitor for other emergency event notifications as well. If an emergency event is indicated by the driver, process 100 continues to step 106.

At step 106, the cabin processor 22 actuates the cabin transmitter 32 to transmit signals to law enforcement authorities, a private monitoring entity, or predetermined third party contacts so as to indicate that an emergency event is occurring in real time at the respective vehicle. As described above, global position data, vehicle identification data, owner data, video data, audio data, and even fire event data may be transmitted. Process 100 then proceeds to step 110.

At step 110, the cabin receiver 34 and then cabin processor 22 may receive vehicle instructions from the contacted authorities. For instance, the police may, upon viewing audio and video data, may send instructions to lock the vehicles doors and windows to prevent the alleged thief from exiting the vehicle until apprehended. They may send audio or text messages to communicate with the alleged thief or captive driver.

The present invention also includes a "driver-not-present" process 200. Process 200 corresponds to a situation in which a vehicle is stolen while the driver is not present or where the driver is forced out of his vehicle and the thief drives it away. Process 200 begins at step 202 at which a driver may report a vehicle has been stolen by utilizing the mobile application described above. Specifically, at step 204 the mobile application may be running on a cell phone and so cellular signals or calls are initiated to law enforcement, security, or third parties. Process 200 proceeds to step 206.

At step 206, the mobile application may communicate with the cabin processor 22 to actuate the GPS module, camera, microphone, and the like to collect respective data and to transmit it to respective authorities. Then, at step 208, the owner may take actions such as sending voice messages, text messages, and vehicle instructions to the cabin module 20 as described above. Similarly, law enforcement authorities may transmit vehicle instructions and messages to the cabin module 20 and alleged thief as well at step 210. Further, fire event detection notifications may occur at step 212.

Figure 7:
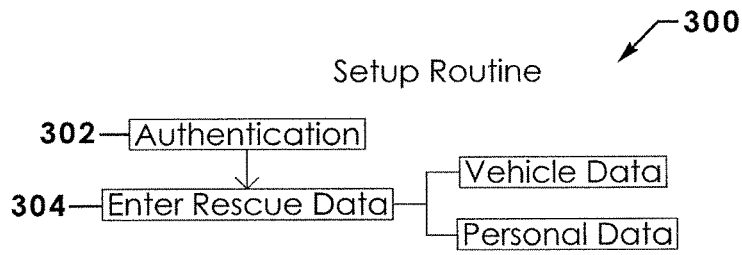
FIG. 7 is a flowchart illustrating a system setup process.

Process 300 is illustrated in FIG. 7 and is directed to a setup routine to prepare the overall system 10 for operation. Specifically, a driver or drivers may enter their fingerprint data into respective data structures in memory 24 at step 302, preferably when the system 10 is first installed into a vehicle. Similarly, rescue data may be entered at step 304, including vehicle identification data (tag number, vehicle identification number (VIN), vehicle make and model description). Rescue data may also include personal information about the driver (such as personal description, age, distinguishing characteristics, medical information, persons to be contacted in an emergency, and the like).

Figure 8:
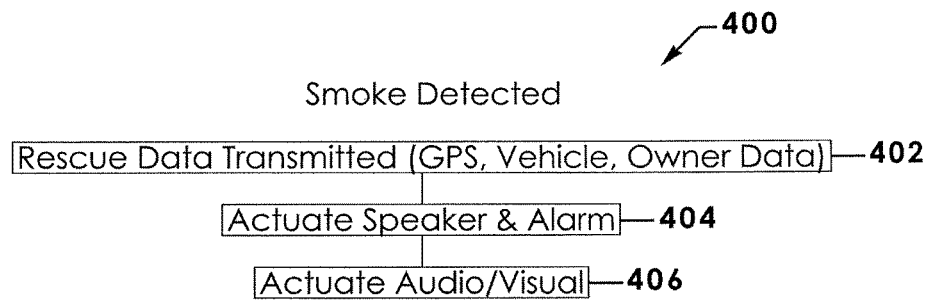
FIG. 8 is a flowchart illustrating a smoke detection process.

Process 400, illustrated in FIG. 8, is directed to fire event detection. More particularly, process 400 begins at step 402 at which the cabin processor 22 determines if a fire event, such as smoke, has been detected and, if so, transmits a fire alert signal along with rescue data such as global position data, vehicle identification data, owner data, and the like. It is understood that transmittal of rescue data may be cellular phone signals, electromagnetic signals, email, internet website, or the like. Process 400 then proceeds to step 404.

At step 404, the cabin processor 22 may facilitate actuating an audible alarm or an audio message over the speaker 30. Similarly, the cabin processor 22 may actuate audio and visual components, such as the camera 26 and microphone 28 and, later, transmittal of recorded data such that law enforcement or security personnel can know the extent of the fire event being experienced.

Figure 9:
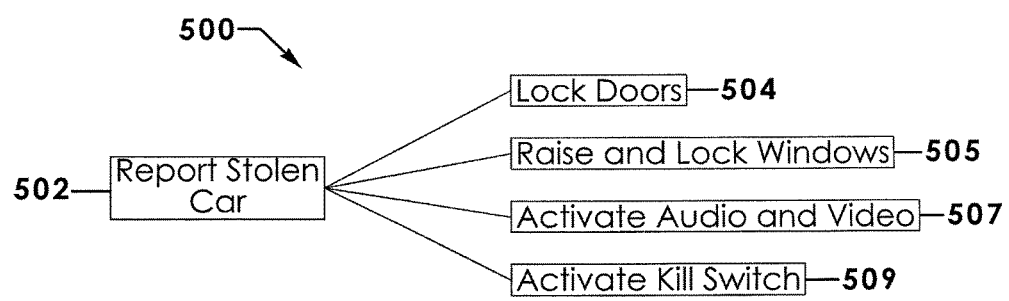
FIG. 9 is a flowchart illustrating a software application process.

Process 500, illustrated in FIG. 9, schematically shows how the mobile application operates to deliver vehicle instructions to the cabin processor 22 and, indirectly, to the vehicle computer 12. At step 502, the mobile application 50 determines if a vehicle has been stolen. This may simply be a matter of a driver entering or selecting this option into the mobile application software designed to receive this information. Then, operation of the mobile application 50 enables a user—such as the owner of a stolen automobile—to transmit signals to the cabin module 20 that facilitate action by the vehicle computer 12 to lock the car doors (step 504), raise and lock the windows (step 506), activate audio (microphone) and video (camera), and to activate a kill-switch (step 509) to de-energize the motor.

Accordingly, the present invention is useful to a driver to be able to instantly signal for the assistance of police or other predetermined rescuers in case of an emergency event, such as a carjacking or the like.

It is understood that while certain forms of this invention have been illustrated and described, it is not limited thereto except insofar as such limitations are included in the following claims and allowable functional equivalents thereof.

The invention claimed is:

1. A theft deterrence, prevention, and recovery system for use in monitoring a theft status of a vehicle having an interior cabin and a vehicle computer, said system comprising:
    a cabin module positioned inside the interior cabin of the vehicle, comprising:
        a cabin memory configured to store data and programming;
        a cabin processor in data communication with said cabin memory;
        a cabin camera in data communication with said cabin processor and configured to selectively record video in the interior cabin of the vehicle;
        a cabin microphone in data communication with said cabin processor and configured to selectively record audio in the interior cabin of the vehicle;
        a global positioning system ("GPS") in data communication with said cabin processor and configured to generate real time global position data;
        an input device in data communication with said cabin processor, said input device being configured to receive user input data indicative of an emergency event;
        a cabin transmitter in data communication with said cabin processor;
        a cabin receiver in data communication with said cabin processor and configured to receive a signal from at least one of a law enforcement agency and a mobile application running on a mobile computing device remote from said interior cabin and associated with a user;
        a fire event sensor positioned on or inside the interior cabin and in data communication with said cabin processor, said fire event sensor configured to detect a fire event inside said interior cabin of the vehicle;
        an auxiliary fire event sensor positioned in an engine compartment of the vehicle and in data communication with said cabin processor, said auxiliary fire event sensor configured to detect a fire event proximate the engine of the vehicle; and
    the mobile application configured to selectively transmit on demand 1) a plurality of vehicle instructions capable of interfacing with the vehicle computer and 2) a theft alert signal to said law enforcement agency indicative that the vehicle has been stolen;
    wherein said input device includes a biosensor configured to received biometric input data from the user; said memory includes predetermined biometric data indicative of authorized users of said cabin module; programming in said memory that, when executed by said cabin processor, causes said cabin processor to compare the received biometric input data to said predetermined biometric data to determine said user is an authorized user, if a match is found, to actuate said cabin module to be accessible;
    programming in said memory that, when executed by said cabin processor after determining said authorized user, causes said cabin processor to determine if said user input data indicative of said emergency event has been received from said input device and, if so, to cause real time video data to be recorded by said cabin camera and to cause real time audio data to be recorded from said cabin microphone;
    programming in said memory that, when executed by said processor and only if said emergency event is indicated, causes said cabin processor to transmit said real time video data, said real time audio data, real time global position data, and input data via said cabin transmitter to said law enforcement agency and to said mobile application; wherein said input data comprises at least one of vehicle identification data and personal information about said authorized user;
    wherein said mobile application is configured to receive said GPS data transmitted by said cabin transmitter and to display said received GPS data on the mobile computing device;
    wherein said received signal from the at least one of the law enforcement agency and the mobile application is one of an audio message, a text message, or a vehicle instruction;
    programming in said memory that, when executed by said cabin processor, causes said cabin processor to emit said audio message through a cabin speaker of the vehicle, publish said text message on said input device, and cause the vehicle computer to actuate a vehicle component according to said vehicle instruction, respectively;
    wherein said memory comprises programming that, when executed by said cabin processor, causes said cabin processor to determine if said fire event sensor or said auxiliary fire event sensor has detected the fire event and, if so, to:
        transmit a fire alert signal to respective law enforcement, security, or other predetermined personnel;
        collect and transmit said real time GPS data to notify said law enforcement, security, or other predetermined personnel a location of the vehicle;
        to collect and transmit real time video data recorded by said cabin camera and real time audio data collected from said cabin microphone to said law enforcement, security, or other predetermined personnel to allow said law enforcement, security, or other predetermined personnel to provide a vehicle instruction to control a vehicle component of the vehicle or communicate with a theft and/or the authorized user in the vehicle.

2. The theft deterrence, prevention, and recovery system as in claim 1, wherein said plurality of vehicle instructions includes a lock doors instruction, a raise and lock windows instruction, an activate camera and microphone instruction, and an engine kill switch instruction.

3. The theft deterrence, prevention, and recovery system as in claim 1, wherein said input device is a touch screen display.

4. A method for deterring, preventing, and recovering theft of a vehicle having an interior cabin and a vehicle computer, comprising:
providing a cabin module situated in the interior cabin of the vehicle, said cabin module comprising:
　a cabin memory configured to store data and programming;
　a cabin processor in data communication with said cabin memory;
　a cabin camera in data communication with said cabin processor and configured to record video within the interior cabin;
　cabin microphone in data communication with said cabin processor and configured to record audio within the interior cabin;
　a global positioning system ("GPS") in data communication with said cabin processor and configured to generate real time global position data;
　an input device in data communication with said cabin processor, said input device being configured to receive user input data indicative of an emergency event;
　a cabin transmitter in data communication with said cabin processor;
　a cabin receiver in data communication with said cabin processor and configured to receive a signal from at least one of a law enforcement agency and a mobile application running on a mobile computing device remote from said interior cabin and associated with a user;
　a fire event sensor positioned on or inside the interior cabin and in data communication with said cabin processor, said fire event sensor configured to detect a fire event inside said interior cabin of the vehicle; and
　an auxiliary fire event sensor positioned in an engine compartment of the vehicle and in data communication with said cabin processor, said auxiliary fire event sensor configured to detect a fire event proximate the engine of the vehicle;
providing the mobile application running on the mobile computing device remote from said cabin module and that is configured to selectively transmit on demand 1) a plurality of vehicle instructions capable of interfacing with the vehicle computer and 2) a theft alert signal to said law enforcement agency indicative that the vehicle has been stolen;
authenticating, by said cabin processor, the user via said input device wherein said input device includes a biosensor configured to receive biometric input data from said user and said cabin processor compares said received biometric input data to predetermined biometric data indicative of authorized users of said cabin module stored in said memory to determine said user is an authorized user, if a match is found, to actuate said cabin module to be accessible;
monitoring the emergency event after said authenticating based on said biometric input data;
in response to said emergency event, the cabin processor:
recording real time video data via said cabin camera and recording real time audio data via said cabin microphone;
transmitting to said law enforcement agency and to said mobile application via said cabin transmitter of said cabin module said real time video data, said real time audio data, input data, and said real time GPS data; wherein said input data comprises at least one of vehicle identification data and personal information about said authorized user;
receiving, via said cabin receiver, a signal from the at least one of the law enforcement agency and the mobile application, wherein said received signal is one of an audio message, a text message, or a vehicle instruction and wherein said memory comprises programming, when executed by said cabin processor, causes said cabin processor to emit said audio message through a cabin speaker of the vehicle, publish said text message on said input device, and cause the vehicle computer to actuate a vehicle component according to said vehicle instruction, respectively;
in response to said fire event detected by said fire event sensor or said auxiliary fire event sensor, the cabin processor being configured to:
　transmit a fire alert signal to respective law enforcement, security, or other predetermined personnel;
　collect and transmit said real time GPS data to notify said law enforcement, security, or other predetermined personnel a location of the vehicle;
　to collect and transmit real time video data recorded by said cabin camera and real time audio data collected from said cabin microphone to said law enforcement, security, or other predetermined personnel to allow said law enforcement, security, or other predetermined personnel to provide a vehicle instruction to control a vehicle component of the vehicle or communicate with a theft and/or the authorized user in the vehicle.

5. The method as in claim 4, wherein said plurality of vehicle instructions are taken from a group including a lock doors instruction, a raise and lock windows instruction, an activate camera and microphone instruction, and an engine kill switch instruction.

* * * * *